March 25, 1958 P. W. JOHNSON 2,827,817
DRIVING CENTER
Filed March 13, 1953
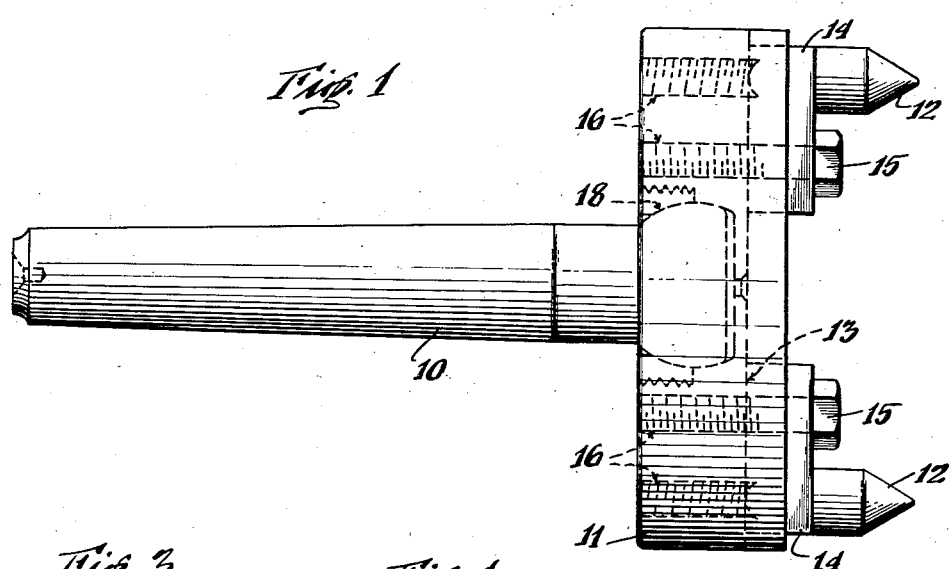
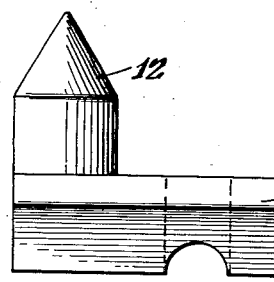
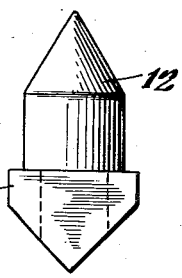
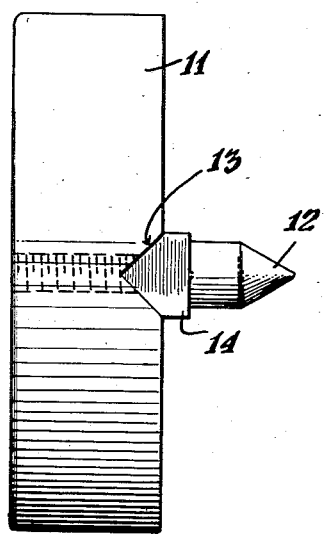
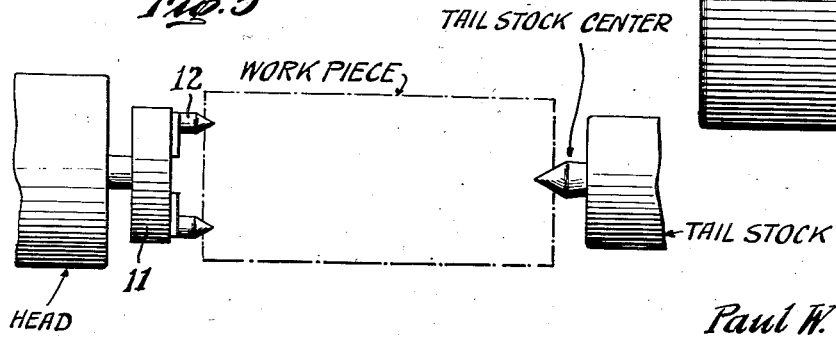
INVENTOR.
Paul W. Johnson
BY
Bohleber, Jassett & Montstream
ATTORNEYS Patented Mar. 25, 1958

2,827,817

DRIVING CENTER

Paul W. Johnson, Bloomfield, Conn.

Application March 13, 1953, Serial No. 342,133

1 Claim. (Cl. 82—40)

The invention pertains to a driving center for lathes and the like. Usually a piece of work mounted between centers on a lathe has a dog clamped to the outer periphery of the work piece at one end thereof with an arm engaging in a slot in a face plate which is driven by the head of the lathe to rotate the work piece on the lathe. With such a driving dog it is impossible to turn the work piece throughout the length thereof or particularly that portion of the work piece which is engaged by the dog. Should it be required to turn the full length of the work piece the dog must be removed, the work piece turned around and the dog clamped to the other end of the work piece. The dog does not center the work piece in a lathe and its sole function is to provide a driving connection with the work piece.

It is an object of the invention to construct a driving center for lathes and the like which establishes a driving connection between the end face of the work and the rotating spindle of the head of the lathe and enables the entire length of the work piece to be turned or machined.

Another object of the invention is to construct a driving center for lathes and the like which is adjustable for different diameters of work.

Another object of the invention is to construct a driving center which centers a work piece in a machine and also provides a driving connection with the work piece.

Other objects of the invention will be more apparent from the following description when taken in connection with the accompanying drawing illustrating a preferred embodiment thereof in which:

Figure 1 is a side elevation of a driving center having adjustable centers;

Figure 2 is a top view of the driving center of Figure 1;

Figure 3 is a side elevation of a center block or member for the driving center;

Figure 4 is an end elevation of the center block or member of Figure 3; and

Figure 5 illustrates the driving center in use.

The driving center includes a taper shank 10 which is received in the taper socket of the spindle of a lathe head and at the end of the shank is a radially extending center support 11 shown as a circular face plate. The center support or face plate in its simplest form carries or has secured thereto, a pair of spaced work engaging members or centers 12 having the usual 60° cone of a center. The centers are received in center holes carried by the end of the work piece so that the work piece is both centered and rotated by the engagement of the pair of centers in the pair of spaced holes in the end of the work piece. The usual center drill is used to form the holes in the end of the work piece to receive the centers. It is desirable although not essential that the holes in the end of the work piece correspond in spacing with the spacing of the centers. If the spacing is not the same but such that the centers enter the center holes, the angle of the center points allows the work piece to adjust itself with respect to a wider or narrower spacing of the center holes in the end of the work piece. There is no loss in the efficiency or force which is transmitted to the work piece through the centers by virtue of the fact that the centers and the center holes in the end of the work piece are not of exactly equal spacing.

Preferably the work engaging members or centers are adjustable in order to adapt the driving center for a wider range of different diameters of work pieces. To this end a radial aligning means 13, shown as a V groove, is provided in the face of the face plate and extends radially thereof. A V block or member 14 carrying a center 12 is received in the groove. Securing means is provided to secure the V block in position in the face plate groove, the means shown being a bolt 15 engaging in a threaded hole 16 in the center support 11. By providing a series of holes 16 for the bolt and by turning the center members 14 around, a wide range of spacings of the two centers 12 may be secured. For example in Figure 1 the centers 12 are radially outward with respect to the bolt 15. By turning the V member around so that the center is radially inward of the bolt, a second spacing is secured. Another pair of threaded holes 16 provides its two spacings of centers. With two pairs of threaded holes therefore four different radial positions or spacings of the work engaging members or centers are secured. It is clear that any number of holes may be provided.

In drilling the spaced center holes in the end of the work piece, the drill press should be equipped with a stop and each of the two holes drilled to a depth determined by the stop. If this is done, should the end of the work piece be not square, the increased depth of one center hole with respect to the other automatically compensates for the out-of-squareness. The driving center also may include a universal mounting such as a ball and socket connection 18 for the center support so that the center support or the face plate may angularly shift. With this form of construction it is immaterial whether or not the end face of the work piece is square or the holes are drilled to a depth to compensate for any out-of-squareness of the end of the work piece. The ball and socket connection adjusts itself to any out-of-squareness of the end of the work piece.

This invention is presented to fill a need for improvements in a driving center. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

A driving center to be received in a taper socket in a driving shaft comprising a taper shank to fit a taper socket in a driving shaft, a center support extending radially from the shank, a diametrically extending groove in the face of the support, a pair of mounting blocks received in the groove, means to secure the mounting blocks to the center support within the groove at fixed points spaced radially from each other, and a work engaging means having a conical end carried by each mounting block equidistant from the center of the shank and spaced from the securing means in the direction of the groove whereby the mounting blocks may be reversed to change the spacing between the work engaging means, the work engaging means projecting beyond the center support at all times and with their axes parallel to the axis of the taper shank.

(References on following page)

References Cited in the file of this patent

UNITED STATES PATENTS

| | | |
|---|---|---|
| 1,104,863 | Baldwin | July 28, 1914 |
| 1,239,027 | Mentzer | Sept. 4, 1917 |
| 1,391,034 | Williams | Sept. 20, 1921 |
| 1,611,122 | Mirfield | Dec. 14, 1926 |
| 1,645,219 | Boynton | Oct. 11, 1927 |
| 2,194,391 | Ingalsbe | Mar. 19, 1940 |
| 2,337,727 | Sandelin | Dec. 28, 1943 |
| 2,469,630 | Braun | May 10, 1949 |
| 2,622,635 | Mason | Dec. 23, 1952 |

FOREIGN PATENTS

| | | |
|---|---|---|
| 969,616 | France | Dec. 22, 1950 |